April 2, 1963 P. J. RIEPPEL ET AL 3,084,244
APPARATUS AND PROCESS FOR WELDING PIPELINES AND THE LIKE
Filed Oct. 5, 1960 4 Sheets-Sheet 1

Perry J. Rieppel
Jerome W. Nelson
Glenn E. Faulkner
Harry C. Cook

Inventors

By *Edwin M. Thomas* Attorney

April 2, 1963 P. J. RIEPPEL ET AL 3,084,244
APPARATUS AND PROCESS FOR WELDING PIPELINES AND THE LIKE
Filed Oct. 5, 1960 4 Sheets-Sheet 2

Perry J. Rieppel   Glenn E. Faulkner   Inventors
Jerome W. Nelson   Harry C. Cook By *Edwin M. Thomas* Attorney April 2, 1963 P. J. RIEPPEL ET AL 3,084,244
APPARATUS AND PROCESS FOR WELDING PIPELINES AND THE LIKE
Filed Oct. 5, 1960 4 Sheets-Sheet 3

Perry J. Rieppel
Jerome W. Nelson
Glenn E. Faulkner
Harry C. Cook
Inventors

By *Edwin M. Thomas* Attorney

April 2, 1963  P. J. RIEPPEL ET AL  3,084,244
APPARATUS AND PROCESS FOR WELDING PIPELINES AND THE LIKE
Filed Oct. 5, 1960  4 Sheets-Sheet 4

Perry J. Rieppel
Jerome W. Nelson
Glenn E. Faulkner
Harry C. Cook
Inventors

By Edwin M. Thomas  Attorney

United States Patent Office 3,084,244
Patented Apr. 2, 1963

3,084,244
APPARATUS AND PROCESS FOR WELDING PIPELINES AND THE LIKE
Perry J. Rieppel, Worthington, and Glenn E. Faulkner and Jerome W. Nelson, Columbus, Ohio, and Harry C. Cook, Orange, N.J., assignors, by direct and mesne assignments, to Esso Research and Engineering Company, Elizabeth, N.J., a corporation of Delaware
Filed Oct. 5, 1960, Ser. No. 60,684
17 Claims. (Cl. 219—60)

The present invention relates to a process of welding and also to apparatus for carrying out such a process. It relates more specifically to an automatic process for making circumferential welds, particularly in large pipelines and analogous structures. In its apparatus aspects, the invention concerns high speed welding equipment which is largely automatic or at least semi-automatic for performing relatively continuous welding, particularly in forming girth welds in large diameter pipelines.

As one of their more important applications, the process and apparatus will be described especially with reference to welding joints in steel pipe, such as is used in pipelines for transmission of natural gas and petroleum products. The invention, of course, can be used for pipe of aluminum or other metals, and it has other applications as well.

In the prior art, various suggestions have been made for automatic or semi-automatic welding of butt joints in pipes and other structures. Generally speaking, however, the prior proposed automatic apparatus and methods are too slow and not adaptable to large pipelines, or they have required considerable manual work or large cumbersome auxiliary equipment to supplement the machine welding. As a general practice in the field, pipelines have been welded by abutting the pipe ends, which are previously machined to a bevel. When pipe lengths are brought together, the adjoining bevels form a groove to be filled with welding material. The welds are normally prepared by clamping the joint, usually internally, to hold the pipe sections in proper abutting relation for the welding operation, and applying the welding material by means of a manually controlled electric arc. The weld metal in the prior art process is ordinarily applied in small increments to fill the V-groove. This groove presents an angle of about 60° to 75°, this angle being determined when the pipe ends are machined prior to assembly in the pipeline. This type of welding has usually been accomplished first by applying a "stringer bead," a partial weld which holds the pipe lengths together with weld metal applied around the circumference, and is then carried on piecemeal in a series of manual operations to build up the weld and complete it. It requires considerable operative skill as well as much time, manual labor and material to do an acceptable job. Some of the welds made by present methods tend to be rough and uneven in appearance, and may contain cavities, flaws and other faults.

Primary objects of the present invention are to make accurate machine welds, and to form mechanical welds rapidly, especially welds in large pipes and more particularly in pipelines which cannot be rotated, by first forming carefully controlled uniformly sized kerfs or spaces between the parts to be welded and then filling them with welding material. Another object is to fill the welds evenly and completely with a minimum of operations—commonly in a single pass operation, especially with standard .280 inch pipe. With thicker pipe, e.g. ⅜ inch, even if a second pass is required, operations are minimized. Still another is to achieve a high degree of uniformity in weld quality and strength and to control and direct as desired the flow of the molten metal.

It is also an object to substantially prevent deformation of the weld joint due to shrinking and other forces as the welding is being accomplished.

A further and more specific object is to provide in a single combination of apparatus, means for rapid overland pipeline welding in the field. This includes means for forming a carefully controlled kerf or space between the abutting pipe ends to be welded together which is substantially uniform in width at all times during welding. It includes keeping proper alignment between the joint elements and the welding head. Another object is to feed welding material at a controlled and uniform rate during continuous traverse of the welding head, which traverse also is at a uniform controlled speed, the welding material feed being carried out in a carefully controlled speed relation with respect to traverse speed.

Further specific objects are the following, although the invention is not limited thereto, as indicated above:

A. To make satisfactory welds with a minimum number of passes, especially in plate and pipe of about ¼ to about ⅜ inch thickness or more in all positions, e.g. in pipe welding to weld uniformly, usually and preferably in single pass operation at the top, sides and bottom of a non-rotated pipe. Multiple pass operations where type and thickness of pipe require them, are also contemplated.

B. To weld an unusually narrow joint, usually in single pass operation, where the actual joint or gap depth to width ratio is from about 3 to 7:1 (preferably 4.5 to 6.5:1), and where the fusion zone depth to width ratio is of the general range of about 2 to 1 or more.

C. To form welds of unusual but highly desirable fusion line geometry, especially for single-pass or minimum pass welds. In the present invention, using a continuously fed welding wire, the fusion zone narrows under the wire burn off position but flares out at the root due to superheated metal under the arc, thus melting back the root edges; this insures good root fusion and is an important result.

D. To weld steel plate and/or pipe especially in approximately the ¼ to ⅜ inch thickness range, in any position, i.e. flat, vertical or even from underneath, and in a single pass and at a high linear speed, without requiring a backing for the weld at the root of the joint.

E. To accomplish efficient and economical welding by a unique welding action obtained by the proper combination and control of welding variables (traverse rate, weld wire feed, gap width, electric potential and current, etc.) in a well controlled and substantially automatic process.

F. To use a substantially continuous arc, with relatively very little fluctuation in amperage, while making complete welds in all positions as required in welding non-rotatable pipe.

G. To form welds having an unusual texture and high strength, preferably by single pass operation, and in any case with minimum operations in a deep, narrow, vertical walled gap or space.

H. To weld rapidly in the field, with light weight equipment, larger diameter pipelines than hitherto feasible, using a welding technique which is largely automatic and is carefully controlled.

Still more specific objects will appear from a detailed description of the process and apparatus which follows.

The process, and with suitable modifications the apparatus, may be used for straight or flat welds of abutting members, e.g. joints or seams in flat and curved plates of suitable thickness, as well as welding together the ends of adjoining pipe sections, and in various positions and from various directions. With suitable variations such as use of selected inert or shielding gases and appropriate fluxes, etc., known to those skilled in the art, the basic process may be used also for welding metals other than steel. Its principal application as presently envisaged however, is in welding the end or girth joints of large steel pipes, e.g. from 14 or 16 inches diameter up to 30, 36, 42 inch diameter and larger.

In forming girth welds around horizontal pipes in fixed or relatively fixed position, as they are usually placed in pipelines, where the pipe cannot be rotated but the weld must be formed around it, special problems are encountered in controlling the flow of molten metal. At the top, especially in conventional welds, the metal tends to flow to the root of the weld at the inside of the pipe leaving beads and other intrusions inside, or causing "burn-throughs."

In welding "out of position," i.e. in positions other than the flat or horizontal, e.g. at the sides of pipelines, the molten weld metal tends to flow around the pipe rather than into the joint. At the bottom of such a pipe joint, molten metal tends by gravity to flow down and out of the joint rather than into it. The effect of gravity on the molten weld metal is only one of the problems since the thermal and convective effects of the arc and the gases surrounding it also are important. The force of the arc itself (involving flow of ionized gases, vaporized metal, etc. flowing from the heat source) is another factor to be reckoned with, and capillary flow is another. Furthermore, the cooling rate is such that it tends to minimize the amount of molten metal which must be kept in place until it solidifies.

Conventional girth welds in steel pipe, which are normally made in several passes in the prior art, are often made in successive waves or stages, e.g. one, two, or three welders may make a "first pass," applying a thin line of weld metal or "stringer bead," to partially weld the pipe joint and thus hold the pipe ends temporarily in proper abutting relationship while internal clamps and other equipment are moved ahead. Subsequently, other welders make a "second pass," filling in the joint substantially. Finally, other subsequent passes and/or "finish" welds may be made, adding enough metal to fill the joint and provide a flush or slightly convex weld bead. This practice is commonly followed in order that the construction of the pipeline can proceed across country rapidly, consistent with the ability of the pipe handlers, trenchers, benders, etc., to string it out in place. A commercially successful machine must be able to keep up and must be highly reliable. The demand for mileage production in pipe lining has militated against the success of prior art automatic welding processes because of their lack of reliability and flexibility and their lack of adaptability to rapid setting up and shifting.

The welding process of the present invention has the important advantages of wide flexibility combined with reliability. It makes it possible, with reasonable amounts of equipment and with equipment of reasonable size, weight, and versatility, to prepare high quality girth welds at rates which can keep up with high speed pipe laying practices in the field and at substantially reduced cost. Welds of adequate tensile strength and ductility, equivalent to or greater than that of the basic pipe metals, can be made consistently. Human variables are largely eliminated, giving superior weld quality and uniformity; smaller amounts of welding rod or wire are consumed, and the process can be more easily protected from variations in weather and other ambient conditions than prior art methods.

An additional advantage is that low-hydrogen welding materials may be used, avoiding base-metal cracking which frequently occurs, especially in stringer bead welds using such materials.

In our prior application Serial No. 825,159, filed July 6, 1959, a unitary apparatus was described in detail. The present invention uses the same basic process but also involves improvements and modifications thereof for better adaptation to larger pipelines. In particular, the present invention includes novel features such as light weight, readily portable track elements, and relatively small self-contained and self-propelled "planetary" or orbital operating units for cutting and welding. Arrangements are such that the equipment can be rapidly mounted, operated, disassembled, and moved on to the next operation as the pipeline progresses. The moving and setting up of a heavy welding machine at each joint becomes unnecessary.

A special and particular object of the present invention is to facilitate and make more flexible the machine welding of large pipelines by novel equipment. A related object is a novel method of using such equipment.

The invention will be better understood by reference to the attached drawings, wherein:

FIG. 1 is an elevational view, taken transversely to a pipeline, of apparatus comprising one aspect of the invention;

FIGS. 2, 3 and 4 are sectional views, somewhat enlarged, taken respectively along lines 2—2, 3—3 and 4—4 of FIG. 1;

It will be understood that the apparatus comprises one aspect of the present invention, but the invention also has process or method aspects which are quite independent of specific forms of apparatus. Thus, the essential steps of the invention so far as its process aspects are concerned, may be carried out with variouss types of apparatus so long as the fundamental mechanism is of suitable type. Before proceeding with the detailed description, a general explanation of the desired operations will be made.

Figures 1, 2, 3:
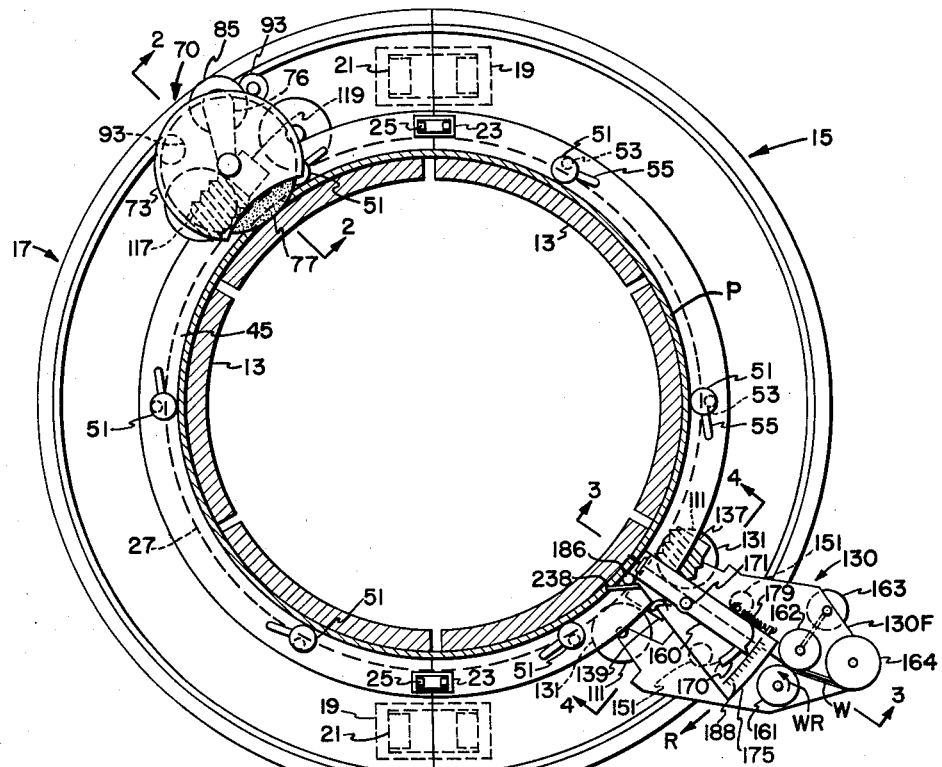

Two joints of pipe are brought into abutting relationship. The joint between them is substantially square although a slight deviation from the square is permissible and, in fact, desirable under specific circumstances which will be mentioned later. The abutting pipe sections are then clamped rigidly, preferably using an internal clamping arrangement which will bring the circumferential surfaces into substantial alignment completely around the periphery of the joint. With the pipes generally held in this position, a narrow kerf or slot is cut between the abutting joints to provide a gap of optimum width for the preferred type of weld. For standard pipe of 0.280 inch thickness, this kerf or cut is preferably of the order of $\frac{1}{16}$ inch width and extends completely through the pipe wall thickness. This may be modified slightly so long as the welding material, welding current, etc. are properly adjusted. In general, however, the width of the gap or kerf should be preferably between about 0.050 and 0.070 inch for pipe of standard 0.280 inch thickness. For thicker pipe, the gap may be made slightly wider than for the standard pipe if other materials and variables are properly adjusted. In general, the following controls must be established:

(a) Properly aligned position of the pipe sections with respect to each other;

(b) The position of the welding apparatus and other associated equipment with respect to the joint;

(c) A rate "R," indicated directionally by an arrow, FIG. 1, of traverse of a welding head along the joint, i.e. circumferentially around the pipe. This rate should be substantially uniform during a given welding pass and is preferably within a uniformity of about 1%, plus or minus, based on the traverse speed;

(d) The rate "WR," FIG. 1, of feeding the welding material, which is preferably a relatively thin welding wire, must be carefully controlled and should be substantially uniform during a given operation for optimum welding quality. The relationship between "R" and "WR" is important and must be so controlled that enough material is fed to fill the gap properly without substantial excess;

(e) The spacing of the welding contact tube "CT" from the outer surface of the joint being welded must be controlled within suitable limits. This distance, which is called the contact-tube-to-work distance or "CTWD," indicated in FIG. 3, requires careful and specific control;

(f) The gap or kerf which is to be filled with welding material must be held to its carefully prepared uniform width. This requires firm holding of the pipe sections against external forces and also against internal forces such as those caused by contraction and expansion of metal due to the thermal effect of the welding operation;

(g) The applied voltage or electromotive force which forms the welding arc must be kept uniform within rather narrow limits. This is particularly a critical factor for continuous single pass welding (or welding in a minimum number of passes), which is the preferred type of operation for automatic pipeline welding;

(h) The whole welding operation must be so handled as to maintain continuous control over the small pool of molten metal formed by the welding arc, regardless of the instantaneous position of the weld around the pipe circumference. The effect of gravity differs widely at various positions, e.g. at the top, sides or lower part of the pipe, and the metal flow varies or tends to vary so that the welding arc, and the molten material flowing from it, must be properly directed and controlled at all times;

(i) The heat generated by the arc, and the effect of the atmospheric and other gaseous material around the welding operation, must be controlled. Preferably a shielding gas is employed to exclude atmospheric oxygen for better control of the type and quality of the weld.

The critical factors mentioned above will be discussed in more detail in connection with the various operations which comprise the involved welding process and apparatus.

As suggested above, the specific apparatus of the present invention is particularly adapted for operations on pipes and pipelines, and on related tubular material of relatively large diameter. The apparatus described in the copending application, Serial No. 825,159, filed July 6, 1959, by the present inventors, involves most of the features just discussed, although it is basically more suitable for smaller pipelines than for larger, simply for reasons of physical size and maneuverability of the work.

In the present case, a separable, portable track element, formed either of one continuous element or of a plurality of separable circular track sections, is provided which can be positioned and held around a pipe to form an annular track to guide and control the travel of the operating equipment. This equipment comprises the welding head and cutting apparatus which is employed therewith. The separable track member, and the operating equipment illustrated in the various drawings will now be described in detail.

Referring first to FIG. 1, there is shown a conventional pipe of relative large diameter, say 20 to 30 inches or more, which is indicated at P, the section only being shown. It will be understood that two such pipes, $P_1$ and $P_2$, FIGS. 2, 3, 5 and 6, are axially aligned and brought to abutting relationship with a square or nearly square butt joint between them. Suitable clamping means, preferably an expandable inner mandrel type, shown fragmentarily at 13, is inserted into the pipes and expanded or otherwise operated to hold them rigidly in position for welding. The clamping means forms no part of the present invention. Desirably, it should extend for a sufficient distance on either side of the joint to hold the pipe ends in proper shape. Various types of clamps are available; usually they comprise several segmental members which can be spread apart and moved radially outwardly for tightening, or moved radially inwardly for contracting and removing the clamp when an operation has been completed. It is important, however, that the clamping means be sufficiently powerful to hold the pipes firmly.

The track elements shown in FIG. 1 in two segments which are to be joined and thus form the complete annular support and guide means for the operating and gap forming units to be described later, are indicated at 15 and 17. Preferably, these segments are identical and interchangeable, especially in the form shown in FIG. 1. They may be held together by suitable means such as simple link units 19 shown in diametrically opposite places at top and bottom which are placed over lugs or raised block elements 1, which may be cast or otherwise formed on the track members 15 and 17. Similar but smaller link units 23 may be used on the front face of the ring being secured over somewhat protruding elements or lugs 25; see FIG. 1.

The cross sectional shape of the track elements 15 and 17 which are identical, is indicated in section in FIGS. 3 and 2 respectively. Each of these main guide track elements, semi-circular in shape, comprises a base cylindrical element or web 27 which is generally concentric with the pipeline, a relatively wide vertical flange element 29 on the back side as shown in FIG. 1, to the left in FIG. 2, and to the right in FIGS. 3 and 4, and a narrower flange 31 on the front. Flange 29 is formed to project horizontally forward to provide an outer rim 33 which, in turn, is formed downwardly or radially inwardly as indicated at 35 to form an annular guiding element. The radially inner edge of flange 37 is machined to form an accurate circular guiding edge or surface for the carriage elements which travel around the track. Likewise, the narrower flange 31 is formed with a horizontal rearward projection 39 and this, in turn, terminates in an accurately machined guide edge or surface 41 which serves to guide another element of the traversing carriage elements to be described.

The semi-circular track members 15 and 17 are formed so as to fit together and form a circle whose inner diameter is just slightly greater than the nominal or standard outer diameter of the pipeline. Hence, for welding pipelines of other diameters, separate track elements may be required, but they are fitted together in the same manner, the only substantial dimentional difference being their diameters. It will be understood that the assembled semi-circular track sections 15 and 17 form a complete annulus which fits loosely about the pipe to be welded.

In order to secure the track 15, 17 firmly in welding position, suitable locking means are required. Here a pneumatic holding means 45 is provided. This is a gas tight annular inflatable tube of rubber or suitable plastic material which can withstand elevated temperatures. It is analogous to a pneumatic vehicle tire but much flatter in cross section. It is provided to fit around the pipeline but its width is confined inside the base element 27 of the assembled guide track, so as to surround the pipe and apply pressure to the track. This tube 45 is provided with a suitable inflating connection, preferably a conventional vehicle tire valve. It can be inflated with air or any suitable gas after the track halves are mounted in place. When inflated, it serves to firmly hold the track with respect to the pipeline so that there will be no misalignment or undesired shifting of the track on the pipeline. This tube 45, as well as associated elements, should be able to withstand the moderately high temperatures imparted to the pipe by the welding and cutting operations to be described. For this purpose, in addition to use of a heat resistant plastic, it may have an outer surface of special heat insulating material such as asbestos or the equivalent.

To prevent transverse or axial displacement of the inflatable tube 45 with respect to the track elements, downwardly projecting flange elements 47 and 49 are formed integrally with the base element 27 on either side. In addition, to prevent minor floating movement on the inflated tube, the track elements are provided with accurate positioning and locking means. As shown, these are in the form of eccentric blocks 51 mounted on pins or bolts 53 set into the flange 29 or 47, each of these being rotatable about the pivot 53 by means of a small lever 55, and so proportioned as to impinge forcibly on the pipe surface when turned to locking position. These clamping means insure against both eccentric mounting of the tracks and misalignment out of planes perpendicular to the pipe axis. However, extreme accuracy of setting is not normally necessary because the traveling carriages are preferably self-aligning within limits as will be described.

The inflatable tube 45 is omitted from FIG. 3 in the interest of simplicity, but it will normally be used. However, the locking elements 51, shown in full lines in FIG. 1, can suffice in some cases. To avoid hiding other elements, the locking elements 51 are shown only on the back flange 29 in FIGS. 2 and 3, but it will be understood that they are or may be used both on the front flange 31 as well as rear flange 29. By suitable rotation of the eccentric elements, they are removed from contact with the pipe surface when it is desired to shift or remove the track assembly from the pipeline.

In some operations, the eccentric locking element 51 may be omitted, relying only on the inflatable tube 45, but generally both will be employed since it is desirable to position the track carefully with respect to the joint and to put it securely in position against shifting during welding and related operations. The track should be rather accurately concentric with the pipe; high precision adjustment is not absolutely necessary. Other known locking and accurate positioning means, such as set screws or equivalent can be used, but for speed of operation the devices shown are preferred.

The base flange on track members 15, 17 also is provided with a traction element or gear rack 61 which is shown in FIGS. 2, 3, 4, 5 and 6. The top or outer circumference of member 27 is indicated by the dotted circle line in FIG. 1. The traction element or rack 61 is provided with evenly spaced teeth or notches, see 140, FIGS. 4, 5, 6, so as to give positive traction to self-propelled carriage means designed to travel around the track as will next be described.

Inasmuch as commercial steel pipe cannot normally be made as exact in dimensions, cross section, etc. as would be ideal, it is not normally practicable to attempt to bring two pipe sections merely into near abutting relationship end-to-end, and try spacing them the exact optimum distance (say about 1/16", for example), which is required for a clean, rapid automatic weld by the present process. Manufacturing tolerances, dents or protuberances due to handling, etc. often interfere. Therefore, it is found preferable to abut the adjoining pipe sections together as tightly and fully as can be done conveniently, realizing that they may not be in completely tight abutting relationship all around the periphery. After the pipes are clamped in this position, a kerf or space of optimum width and of highly uniform dimensions is formed between the pipe ends. For this purpose a cutting wheel of the desired thickness, say 1/16" in this example, is employed to form the desired gap or kerf. The cutter or gap former must, of course, be brought into action and traversed around the joint to cut the gap before the weld is made.

A carriage 70, FIGS. 1, 2, is provided to carry this cutting wheel, which may be a high speed abrasive disc or may be, if desired, a milling type cutter. The cutting wheel 77 itself is largely enclosed in a guard or shield 73, which is mounted concentrically or co-axially but non-rotatably upon a shaft element 75 suitably mounted on a rocker arm 76 which is rotatably supported in carriage frame 70. The cutting disc 77 proper is fixed to the shaft 75 which is rotatable. Shaft 75 is driven by suitable means illustrated as a pulley 79, FIG. 2, in turn driven through a belt or chain 81 by a drive pulley 83 mounted on the axle or main shaft of a powerful electric motor 85. The latter is mounted concentrically with the axis of rocker arm 76. Cutter 77 pivots about the motor axis when raised or lowered.

Inasmuch as cutting must be accomplished rapidly, the cutting disc must be driven at high speed and with adequate power to accomplish its cutting operation at the rate desired. An air driven motor may be substituted for motor 85 where a good source of compressed air is available. Abrasive cutting discs, at the present time, are more satisfactory for high speed cutting than milling type cutters, but the latter may be used on some types of pipe.

The motor 85 and the other apparatus just described, are mounted on a frame 87 of carriage 70 comprising an upstanding web portion 89 which supports the motor 85, and also has a short shaft 91 which supports a guide wheel 93. The latter is grooved to fit snugly on the machined guide surface 35.

The frame member 87 has a horizontally projecting element 97, FIG. 2, which extends forwardly to the right as seen in FIG. 2, and supports a vertical pivot pin 99 on which is mounted a rocker arm 101 which at its front end has a vertical pin or shaft 102 which carries a rotatable guide wheel 103. The latter cooperates with and guides the carriage along the machined guide element 41. By rotating the rocker arm 101 about its pivot pin 99, guide wheel 103 may be disengaged from the guide surface 41 when it is desired to lift the carriage from the guide track 15, 17. A latch 105, suitably spring activated, is pivoted on the frame at 107 so as to lock the guide wheel 103 in position to run along the guide element 41 during operation of the cutting mechanism.

By the means just described, the carriage 70 is constrained to travel around the track. The motor 85 for the cutting disc or wheel 77, is reversible so that the cutter can be driven in either direction as desired. The carriage 70 is supported by a pair of main rollers 111 mounted on shafts 112 secured to a depending element 113 of the frame member 89. This supports the carriage on the horizontal or concentric cylinder surface or web 27 of the track. A bracket member 115 projects forwardly from element 113 and supports a worm gear 117 shown in FIGURE 2 and also in the dotted lines in FIG. 1. The latter is driven by a motor 119, FIG. 1 (a similar but different motor is shown at 139, FIG. 4). Motor 119 is reversible and is accurately controllable as to speed so that the rate of rotation of the worm may be carefully regulated. When motor 119 is operated, the worm 117 which is in mesh with the teeth or gearing 140, FIG. 4, of track element 61, propels the carriage 70 around the track in either direction desired depending on the direction of motor 119. The electric connection to motor 85 is shown only fragmentarily at 120 where it is indicated as a simple electric cord. The electric connections for both motors 85 and 119 must, of course, be such as to allow the carriage 70 to traverse around the pipe for as much as a single full revolution. Suitable guide means are provided, but not shown, to keep all electric (and/or pneumatic, gas carrying, etc.) lines from getting tangled or interfering with other elements. Continuous motion of the carriage 70 for more than a single full revolution in either direction is not normally needed. Slip rings may be used on track 15, 17 to provide continuous electric current where the electric lines are objectionable. For economy of manufacture, they are not usually employed but they can be incorporated in the track base 27 if desired.

The track frame 15, 17, in the form shown in FIGS. 1 to 6, is preferably made of a light weight metal such as aluminum or magnesium, etc. to keep the weight of tracks within reasonable limits for handling, the traction or gearing rack 61 preferably being of harder material such as brass or steel.

It will be understood then that when the apparatus 15, 17 is assembled and carriage 70 is placed on the track, electrical connections being suitably energized, the cutting wheel may begin its operation and after the cutter has made its way through the pipe to a full depth cut, the carriage 70 begins to traverse around the track. Suitable control elements are incorporated in the track 15, 17 to actuate control switches, i.e., first to turn on the cutting power and then to turn on the traversing power, as will be explained below.

The cutting wheel and its driving elements 79, 81, 83 are carried by the rocker arm 76, FIG. 2, so that the cutting edge of wheel 77 may be lowered into contact with the surface of the pipe to be cut. An electrical motor, such as a solenoid suitably dampered, is suitable for this purpose and is indicated generically at 450, FIG. 12. It is omitted from the other drawings. A rotatable motor, with suitable gearing, can of course be used for the same purpose.

On further lowering, the cutter 77 will cut completely through the pipe and continue to do so as the carriage 70 traverses around the track. Normally it is preferred to start cutting at approximately the top center of the pipe and cut a portion of the circumference in one direction, following this by welding the cut portion. Then the cutting apparatus is moved again to the top of the pipe and cut in the opposite direction, after which that portion is welded. It is not normally desirable to cut more than half-way around the pipe in a single operation on medium size pipes, and it is desirable to cut even less on very large pipes, before beginning the welding operation because the expanding effect of the welding heat, and contraction as the weld cools, tend to distort the gap between the pipe ends after it has been cut for a great distance. These operations will be explained more fully below.

Figure 4:
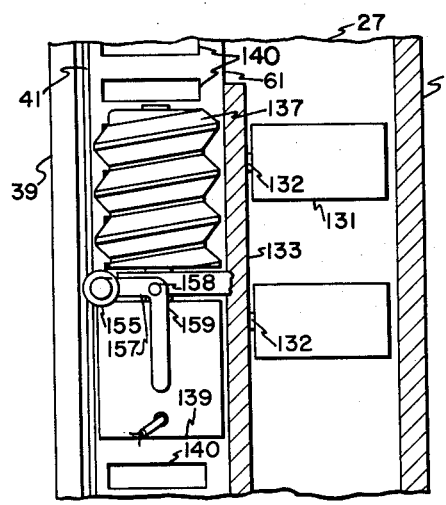

The welding apparatus per se is mounted on a separate carriage 130, which is illustrated in FIGS. 3 and 4 as well as at the lower right of FIG. 1. In general, the construction is analogous to that described for the cutting mechanism. The main carriage frame 130F is supported primarily on a pair of main track rollers 131, mounted on axles 132, secured to a depending flange 133 of frame 130F, similar to rollers 111 of cutting carriage 70. An arm 135 projects forwardly, that is, to the left in FIGS. 3 and 4, to support a worm 137 driven by a motor 139. See especially FIG. 4.

The worm takes the carriage 130 around gear rack 140 on traction member 61, as previously described in connection with worm 117 on the other carriage. This traction member 61 and the gear tooth elements 140 thereof were described above and are best seen in FIGS. 4, 5 and 6. Hence, rotation of the worm by its drive motor 139, propels the carriage frame and associated mechanism along and around the angular track 15, 17 in either direction desired, the motor being reversible.

A pair of guide wheels 151, each mounted on a pin 153, secured to a frame member 154 at the rear thereof as seen in FIG. 1, engage the machined guide element 37, and another guide wheel 155 mounted on a pin 156 on a rocker arm 157, which is pivoted on a pin 158 secured to the carriage frame, engages the front guide element 41. The rocker arm 157 can be moved by lever 159, FIG. 4, to disengage it from the guide track 41 when it is desired to lift the carriage 130 off the track. Latching means such as those described at 105, FIG. 2, are provided but not shown in FIG. 4. These hold the wheel 155 in proper guiding position when the carriage is in operation. By rocking the lever 159 to disengage roller 155 from track guide element 41, the carriage may be lifted bodily off the track.

The welding apparatus which is mounted on the carriage 130, comprises a welding contact tube 160 through which welding wire indicated at "W" is fed by feed rollers 161 and 162, the latter being operated by a suitable controlled speed electric motor drive 163. The wire is withdrawn from a spool 164, suitably supported on a front frame plate 165 secured to, or preferably formed integrally with, main frame 130F. The welding current is supplied to the welding tube 160 through suitable connections 170.

The welding tube 160 is pivotally supported on a pin 171 so that it can be rotated in a vertical plane a few degrees from radial position in either direction with respect to a support plate 175 on which it is mounted so as to vary the angle of the welding wire with respect to the surface of the pipe joint. The support plate 175 is mounted for limited vertical displacement (or a sliding radial displacement with respect to the axis of the pipeline) on a front plate 165 of the carriage frame 130F through pins 176 and 177. These are mounted in slots 178, FIG. 3. A tension spring 179, FIG. 1, tends to normally pull the support plate 175 toward the pipe surface with respect to its mounting plate 165. A small roller is mounted on plate 175 as indicated at 186, and is constantly urged by spring 179 to roll along the surface of the pipe P. Hence, as carriage 130 and the welding equipment it carries moves around the track, roller 186 moves the welding head or contact tube 160 in and out as it follows the surface of the pipe, including any substantial irregularities thereon. It thus keeps the end of the contact tube 160 properly spaced the desired distance (CWD) from the pipe surface at the welding joint, regardless of deviations of the pipe surface from a true circle.

The contact tube 160 can be adjusted angularly about its pivot 171 as shown by scale 188, FIG. 1, so as to provide a desired optimum lagging or leading angle for the wire feed with respect to the joint to be welded. This optimum angle will vary somewhat with traverse speed, direction of welding movement, thickness of pipe, welding current, etc.

The operation of the welding unit is as follows:

Power is supplied to the wire drive motor 163 and to the welding head 160, and at the proper time the traverse motor 139 is operated to drive the worm 137 so as to propel the carriage around the geared track 61. The wire feed rollers 161, 162 push the wire into the narrow groove or kerf to be arc welded, this having been cut previously by cutter or disc 77. A feeler 238, FIG. 1, guides the head along the groove. A continuous welding arc turned on automatically at the right instant, melts off the wire and accomplishes the welding. The heat of welding also fuses the pipe metal back into the pipe so as to perform a complete weld through the thickness of the pipe at a single, or in any case a minimum number, of operations. The continuous control of all the operating variables to accomplish a sound weld joint is described in the aforementioned co-pending application. Essential operating requirements are similar in the present case.

Figure 5:
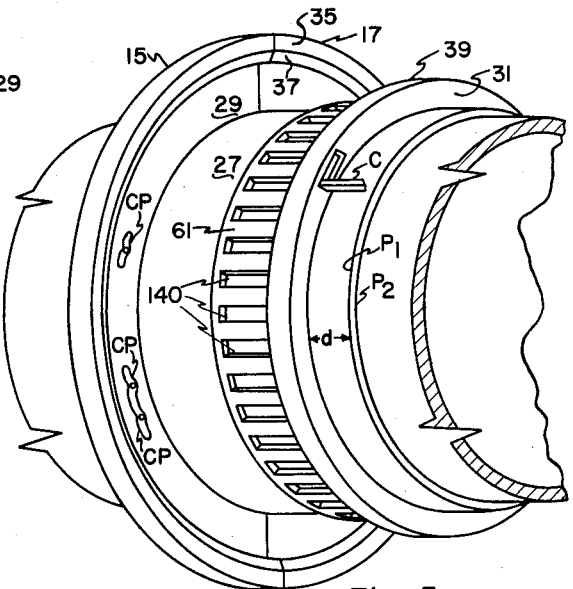
FIG. 5 is a perspective view of a track unit mounted on a pipe to be welded.

In FIG. 5, two abutting pipe sections, $P_1$ and $P_2$, are shown which have been clamped together (preferably by an internal clamp, not shown) in end-to-end abutment and in axial alignment. Track elements 15 and 17 have been fitted around pipe section $P_2$ and have been spaced from the joint a precise distance "$d$" which is determined by a caliper or suitable measuring instrument. A hinged caliper C is shown mounted in the front flange 31 and several such devices may be attached to facilitate positioning of the track with respect to the joint, as will readily be understood. But separate measuring or positioning devices of conventional type may be used if preferred.

The two track sections 15 and 17 are clamped together and locked in position by inflating the tube 45 and/or operating the locks 51. Thereafter, the cutting and welding carriages, respectively, are mounted on the track and passed through the operations previously described. If desired, the cutting carriage can be removed before the welding carriage is placed on the track, but this need not normally be done. Since there will be at least two cuts made and two welding passes per joint, it being preferred never to cut more than half the joint (and it may be desirable on large pipes to cut less) before it is welded, both carriages could be mounted on the track and used alternately.

The matter of length of cut, before each weld is important for another reason. Contraction of the joint will pinch and break the cutting disc, since the cutting or grinding wheel will bind and be broken if the gap closes ever so slightly on the cutting wheel while it is in operating position.

Figure 6:
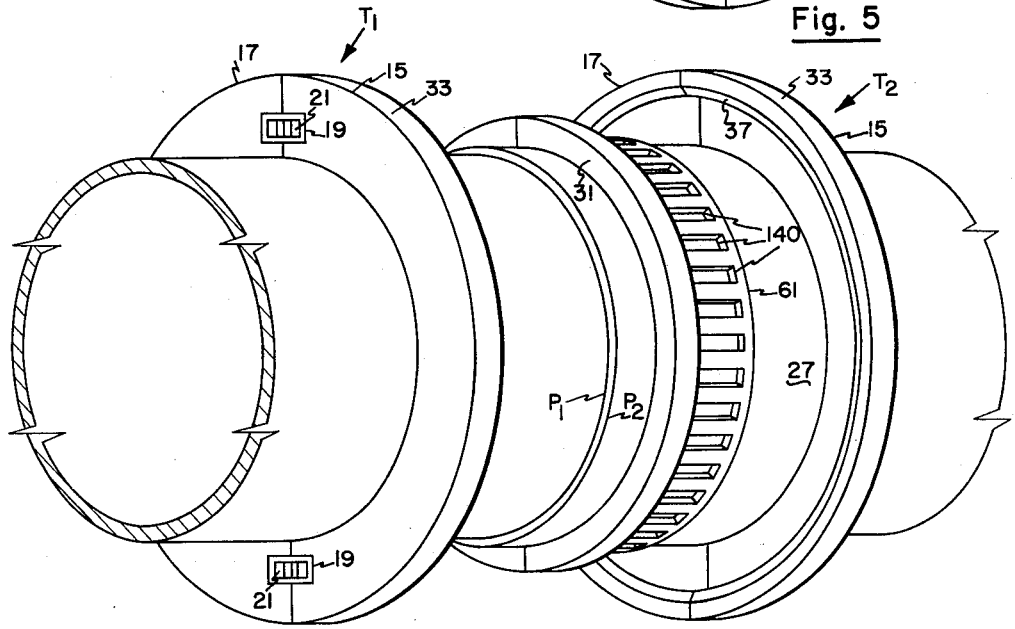
FIG. 6 is a perspective view of a double track arrangement set up on a pipe line to facilitate operations in welded pipeline joints.

In FIG. 6, a modification is shown wherein two pipe sections $P_1$ and $P_2$ are joined for welding and two complete track assemblies, $T_1$ and $T_2$, are clamped in place. The one at the left, indicated as $T_1$, may be used for the cutting carriage; and the one to the right, $T_2$, may be used for the welding operation or vice versa. By using a pair of tracks, the completion of the welded joint may be expedited. Two or more units may be placed on each track to expedite welding of very large pipes. This is frequently of importance when the track laying crew can move ahead faster than the welding operation can be performed. Alternatively, one or more welding units and one or more cutters can be operated on each track if desired.

Figure 7:
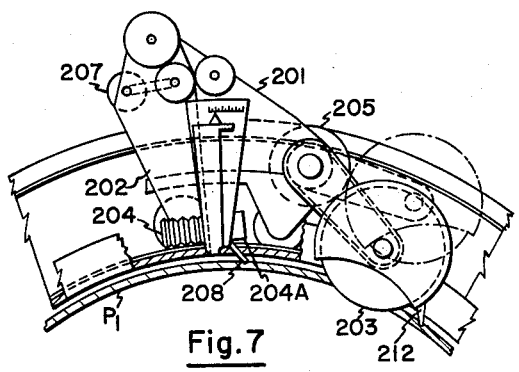
FIG. 7 is a fragmentary view in elevation of a welding and cutting arrangement mounted on a single carriage for conducting these operations either simultaneously or in sequence.

In FIG. 7 there is shown a carriage 201 which incorporates both a welding unit 202 and a cutting unit 203. These elements are not shown in great detail, but it will be understood that a single traction drive worm 204 and a motor 204A will be provided to propel the carriage around the pipe. The cutting wheel is driven by its own separate motor 205, whereas the wire feed for the welder is driven by its separate motor 207. Suitable power means, equivalent to unit 450 of FIG. 12, will be provided to raise and lower the cutting unit from and to cutting position.

The welding head or contact tube is guided precisely into the gap cut by the welding wheel by a feeler 208, which drops into the freshly cut groove. If desired, two feelers may be provided, one operable in one direction and the other in the other direction. The welding head is capable of radial motion in and out on its mounting by being mounted on pins capable of sliding up and down in slots such as previously described in connection with FIG. 3. By this means, the welding wire is always fed into the center of the narrow groove and the welding head is always spaced the correct CTWD distance so that the arc is properly formed and maintained. It is desirable during the welding operation for the wire to project into the center, and not contact either side of the welding groove. This requires a careful and delicate guidance of the wire to the arc.

While the guide track structure previously described has been explained in detail, it will be understood that it may be varied considerably in design. Several variations in cross section are shown in FIGS. 8 to 13. The track must, of course, provide means to keep the carriages at all times in proper relationship to the joint to be welded, and must support them firmly for their orbital movements. The carriages must be supported to space the welding head the proper distance from the pipe and also to traverse it in a plane perpendicular to the pipe axis. Both the welding and cutting carriages must be constrained to travel concentrically about the pipe and in planes perpendicular thereto, and they must not be displaced axially along the pipe during an operation on a particular joint.

Figure 8:
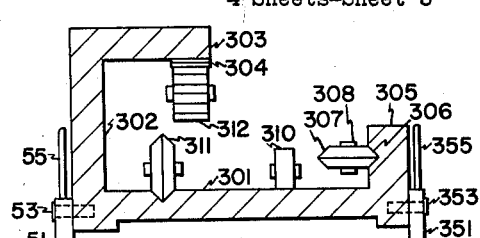
FIGS. 8, 9 and 10 are sectional detail figures showing modified guide track arrangements according to the invention.

In FIG. 8, the guide track shown is of generally the same overall shape as in FIGS. 2 and 3. It has a base web section, concentric with the pipe section as indicated at 301, an upstanding flange 302 turned over at the top at 303, and formed with a gear rack 304 on the under surface of the top extension 303 to provide traction for the carriages. Upstanding flange 305 on the opposite side is formed with a V groove 306 which fits a guide wheel 307 mounted on a shaft or axle 308 of the carriage, not shown. Supporting wheel 310 rides on the upper or outer surface of the main web or base 301. A V groove in this base accommodates another guide wheel 311 mounted on the carriage, and a drive gear 312 engaging rack 304 propels the unit around the track. Suitable motor means are provided but not shown. A worm may be used instead of gear 304. The eccentric locking devices 51, on pins 53 with their handles 55, are substantially the same as those in FIGS. 1 and 2. In FIG. 8, similar locks 351, provided with handles 355, are also mounted on the front of the track at 353. An inflatable tube, not shown, similar to tube 45 of FIG. 2, may be used to assist in holding the tracks in place on the pipe if desired.

Figure 9:
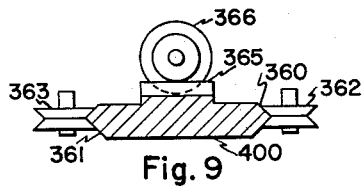

In FIG. 9 a much simpler track arrangement is shown. This consists merely of an annular track element 400 consisting of a heavy strap or band member having machined edges 360 and 361 for engagement by grooved guide wheels 362 and 363 respectively. These wheels are mounted on a suitable structure in the carriage frame. A gear rack 365 is formed on or secured to the upper surface of the band or track 400. A worm 366, suitably driven by means not shown, propels the carriage around the track. A gear wheel may be used in lieu of worm 366, but the worm drive is ordinarily preferred to minimize any back lash in the drive.

Figure 10:
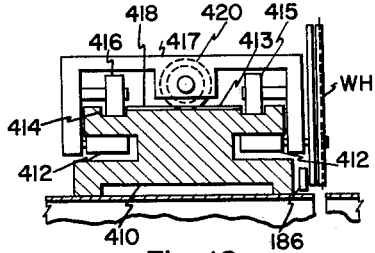

In FIG. 10 there is shown still another track cross section which may be preferred for some operations. Here the basic track or band member is rectangular in overall outline, having a hollow or groove 410 at the bottom to accommodate a tightening device such as the expandable pneumatic tube 45, FIG. 2, which secures the track against lateral shifting, etc. On each side edge, the track is formed with a groove adapted to receive a cylindrical guide roll 411 or 412. On its top surface, two additional grooves 413, 414 are formed to receive additional support and guide rollers 415 and 416. All of these are mounted on a carriage frame 417. A gear rack 418 is formed on the upper surface of the track member. A suitable worm 420, driven by appropriate motor means, propels the unit around the track. Locking means such as 51, FIG. 2, may be used but are not shown in this figure. The welding head WH is shown diagrammatically at the right with its spacing wheel 186, the arrangement generally being identical with that of FIGS. 1 and 3.

Figure 14:
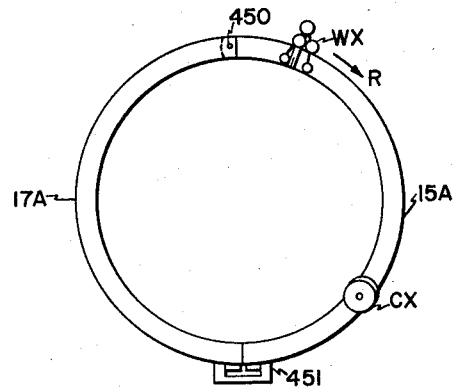
FIG. 14 is a diagrammatic view showing a guide track arrangement of another modified type and illustrating certain sequential operations.

Instead of having two separate and relatively rigid track sections as described in the modifications above, FIGS. 1 to 10, they may be hinged together as indicated in FIG. 14 where track segments 15A and 17A are hinged at pin 450. Diametrically opposite, the ends of the two segments may be locked together by a suitable spanner 451, after which the expanding means 45 shown in FIGS. 1 and 2, plus locking means 51 etc., not shown in FIG. 11, may be operated to hold the track in place. The welding unit WX and cutting unit CX are shown in orbit positions on the track.

The track units described above are all relatively massive and in some situations a simpler track unit is desirable. The heavier tracks, when assembled in working position, provide a rigid trackway of predetermined circumference, giving a positive traction for carriages, and quite independent of normal variations in pipe circumferences or radii. This is desirable but a lighter, more flexible track unit having requisite rigidity and stability would have advantages. A flexible track, in the form of a single band of metal is illustrated in FIGS. 11, 12 and 13.

This band or track member 421 is formed of a fairly heavy gage sheet metal, preferably steel or stainless steel, of sufficient thickness to give firm carriage support but thin enough to bend around the pipe. It is provided with multipoint spacers 422, in the form of studs or rivets, rather closely spaced and of suitable uniform length to hold the track up off the pipe. They may be as short as will provide space for gripping rollers between the band 421 and the surface of a pipe $P_1$.

Figure 13:
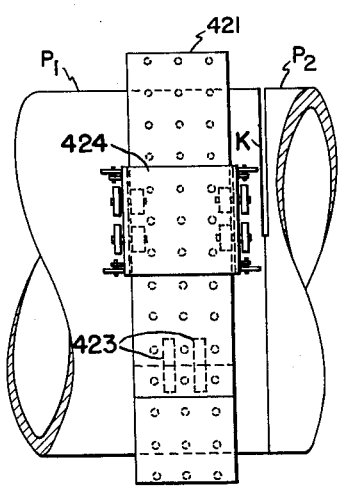
FIG. 13 is a plan view, on reduced scale, and with some parts removed, of the apparatus of FIGS. 11 and 12.

Suitable tensioning means, indicated at 423, FIG. 13, are provided to tighten the band around a pipe with the studs or rivets 422 projecting radially inward against the outer surface of the pipe. These tensioning means may be in the form of screws or bolts, or toggle means may be used. By suitable choice of material and close spacing of the support studs, the band will form a very firm track for cutting and/or welding carriages of the general types previously described.

Figure 11:
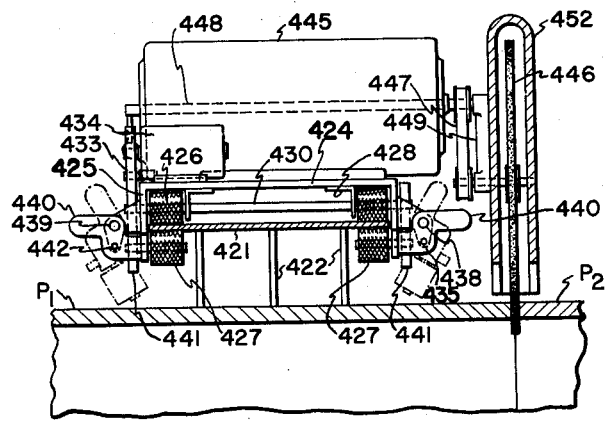
FIG. 11 is a sectional view, parallel to the pipeline axis, of another form of the invention, employing a relatively flexible track element.
Figure 12:
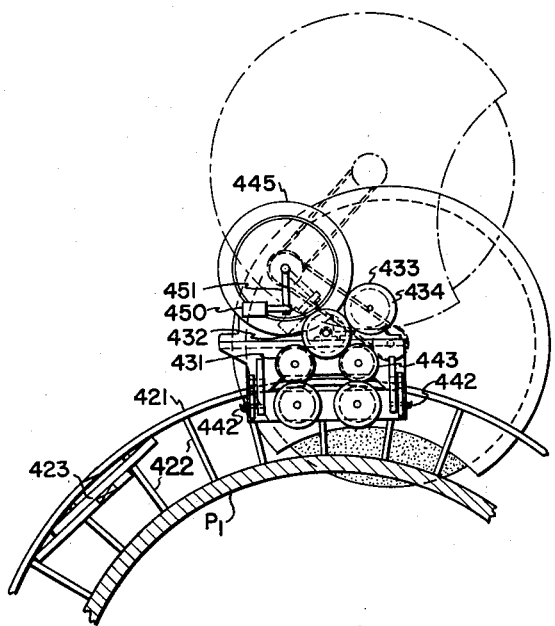
FIG. 12 is a side elevational view of the apparatus of FIG. 11, certain parts being shown in section.

Such a carriage is shown in FIGS. 11 and 12. It comprises a main base member 424 and end plates 425 suitably joined or secured together. Two pairs of upper drive rolls 426 provided with knurled gripping surfaces are opposed by lower rollers 427. Brackets 428 on the lower side of the main base member 424 support two transverse shafts 430 on which rollers 426 are secured. Gears 431 also are fixed on these shafts and at one end the gears 431 are driven by an idler 432 which in turn is driven by a gear 433 on a reversible electric motor 434.

The rolls 427, which cooperate with the drive rolls 426, are each mounted on a rocker arm 435 pivoted on a bracket 436 by a pin 438. Each rocker arm is provided with a handle 440 so that the rollers 427 can be moved to an open position to lift the carriage off the track or can be moved to track gripping position. A gear 441 on each roller meshes, when the rollers are in track gripping position, with a gear 431 so that all the rollers are positively driven to insure good traction as the carriage moves around the track. A latch 442 holds the rolls in track-gripping position until it is released.

On top of base plate 424 is mounted a powerful motor 445, which may be driven by electricity or compressed air, as desired. It drives a cutting disc or wheel 446 through belt or chain drive 447. The shaft of the motor is hollow to receive a rotatable independent shaft 448 which carries rocker arm 449. The cutter wheel and its shield 451 are mounted on this arm so that by rocking the shaft 448, the cutter can be moved to cutting position or lifted to inoperative position.

A solenoid 450, provided with a hydraulic damper to control its speed of operation, is provided to rock the shaft 448 through means of an arm 451 secured to the shaft. When the solenoid is activated by electric current, it moves and holds the cutter to cutting position. A strong spring, not shown, serves to retract the cutter when the solenoid is de-energized.

The welding carriage for this track unit 421 is not shown, but is similar in construction except for the welding and wire feeding elements themselves which are like those in FIGS. 1 and 3.

Figure 15:
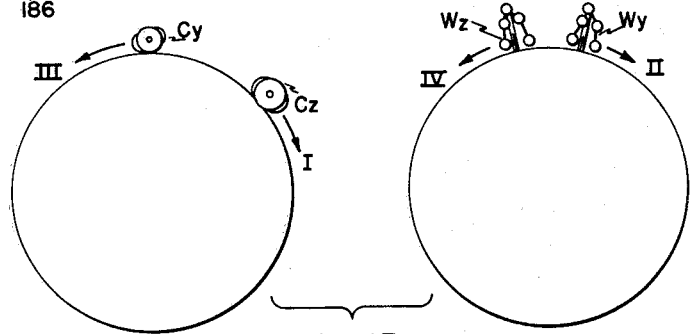
FIG. 15 is a diagrammatic and exploded view of a dual guide track arrangement showing a modified method of welding in an arrangement wherein a number of operations are combined or followed in close sequence.

FIG. 15 is comparable with FIG. 6, already described, in having two track arrangements shown diagrammatically. On one of these, there are mounted two cutting units CY and CZ; and on the other, two welding units WY and WZ. With this arrangement, especially for very large pipes, two main operating cutters and two welding units may be operated at a single joint. The sequence of operation is as follows:

The operator of the CZ cutter starts his cutting operation at the top, and moves downwardly to the right as shown in the left half of FIG. 15. This is operation I. After he proceeds far enough, the operator of the welding unit WY (left half of FIG. 15), starts operation II welding around the same line, filling in the freshly cut groove while cutting is still proceeding. Meanwhile, the operators of the cutting unit CY and welding unit WZ are preparing for their operations on the other half of the pipe. As soon as CZ reaches the bottom, WY follows up with the weld and these two carriages are taken off the tracks. They may be moved to the next joint where a track, or pair of tracks, has been put in place. Obviously, the pipe must be securely clamped before the actual cutting and welding operations so that the contracting force of the weld, as it cools, will not close the gap and break the cutting disc.

The operator of cutter CY now commences at the top of the pipe and moves down the other side, being followed at a suitable interval by the welder WZ. These steps are indicated at III, IV, FIG. 15. With this arrangement, four unit operators complete a large girth weld in a minimum of time and without interference with each other.

The scheme just described makes it possible for a small welding crew to keep pace with a pipe laying outfit, without having to resort to "stringer bead" welding and leap frogging operations, with a large and expensive welding crew. Time required for welding large pipe joints can be cut to a small fraction of that formerly required.

The actual welding operations presently preferred are carried out at a welding head traverse speed of about 35 to 60 inches per minute. In welding pipe of standard 0.280 inch wall thickness, with a joint gap width of about 0.060 inch and wire diameter about 0.040 inch, the wire feed speed should be between about 400 and 700 inches per minute. For different types of welding operations, a wire feed speed of 5 to 20 times the weld traverse rate may be used, depending on wire diameter, width of weld gap, and thickness of the pipe wall. Usually a rate of 8 to 12 inches of wire per inch of weld speed is the more desirable range. In any case, however, the traverse speed should be uniform and within limits of 5% and preferably within limits of 1% for a given operation. The same limits, approximately, apply to the wire feed rate.

The wire feeding mechanism must be so controlled that the wire starts up immediately at essentially full speed as the weld is started. If the feed gradually picks up speed, the weld is not properly filled and is defective. Hence the wire feed rolls may be declutched while the electric drive motor reaches full speed and the clutch thrown in suddenly at the instant the weld is started.

Obviously the cutting rate should be of the same general magnitude as the welding traverse rate, that is, 35 to 60 or 70 inches per minute or even more in standard pipe. Otherwise the speed gained in welding is largely lost. The equipment described above is capable of attaining the desired speed. For thicker wall pipe than standard 0.280", the welding rate and the cutting rate both may be somewhat lower, and still be far ahead of any known operations in the prior art.

In the foregoing description, the detailed controls for operating the cutting and welding equipment have not been shown. It will be understood, however, that it is preferable, in fact usually essential, to have fully automatic control of the traverse motors, the welding wire feed motor, and the motors which control and operate the cutting disc. These all may be initiated by suitable control elements, some of them being contact points CP (FIG. 5), positioned at selected points around the track members operated by a lug on the carriage and actuating suitable switches or other electrical controls, in turn connected with the respective traveling carriages or equipment carried by them. Other switches which are not dependent upon a position on the track may be provided also.

Assuming a start-up with the cutting carriage 70 at the top of the pipe, as in FIG. 1, a typical operating sequence involves first starting up the cutter motor 85 to bring the cutting disc 77 up to cutting speed. After this, the arm 76, FIG. 1, or arm 449, FIGS. 11, 12, is rocked with respect to the shaft of the cutter drive motor. In FIG. 12 it is moved by a suitable solenoid, but hydraulic or mechanical means may be used in lieu of or in addition to solenoids, for example, to force the rotating cutter against the periphery of the pipe at the joint. The cutting disc is lowered until the pipeline is cut through to the interior. Then the motor 119 which drives worm 117, FIGS. 1, 2, is energized and begins to propel the cutter around the pipe for continuing the cutting operation. After this operation has proceeded far enough for the welding to begin, the welding carriage 130 may set in operation with the electric welding current turned on to start motor 139. This turns worm 137, driving the carriage around the pipe. Before this, however, the wire feed motor 163 is started up and as the carriage starts to move, the wire feed rollers start feeding the welding wire W at full speed as a solenoid operated clutch is engaged (not shown).

A gas shielded arc is usually preferred for welding according to the present process. The supply of gas is fed through the contact tube 160, a valve (not shown) being turned on at the appropriate instant by a timer control of suitable type to begin the welding without undue waste of gas. A solenoid operated valve is preferred. The welding current is turned on automatically. When the welding carriage has traveled far enough to complete the first welding step, it is automatically stopped by suitable controls, preferably attached to the track. The welding current is turned off, gas feed and wire feed are stopped, etc. Thereafter, other steps are carried out such as returning the inoperative cutting carriage 70 to the top of the pipe which may be done manually or automatically, as desired, followed by cutting down the other side of the pipe, preferably controlled automatically, although it may be started manually. Following this at the proper time, is the next welding operation. In FIG. 13, a partially cut but not yet welded kerf is shown at K. Where the cutting and welding are accomplished alternately, one half (or one quarter) of the pipe may be cut and then welded, then the other half (or another quarter) is cut, followed by welding. The steps are continued in proper sequence until a complete weld is made. As pointed out above, on large pipes it is preferred to cut and weld smaller segments than semicircles at single operations. Hence, the cutting and welding steps may proceed through smaller arcs. For example, a 60 or 90 degree cutting pass may be made, followed by welding and meanwhile a second 60 or 90 degree cut may be started before the first weld is fully completed. Thus the sequential steps may be overlapped when desired to shorten the time for completing a girth weld. Variations in timing and traverse of the various mechanisms may be made to suit the particular job in hand. An advantageous feature is the flexibility of the multiple carriage system, whereby operations which otherwise must be sequential can be overlapped, i.e. operations I, II, III, IV of FIG. 15, etc.

It was explained above in connection with FIG. 15 that a plurality of cutting units and of welding units may be used simultaneously or in sequence at a single weld joint, particularly on a large pipe. It will be understood also that a welder or a cutter, or both, can be mounted on a single carriage somewhat as in FIG. 7, but with the carriage spanning both tracks. Thus a double track arrangement such as in FIG. 6 may be employed for dual drive around the joint, providing better support and control for a single carriage or for two or more carriages where required for stability and accuracy. For example, guide wheels and drive gearing may be duplicated on each side of the joint in a carriage structure which bridges the joint and runs on both tracks. The gearing in such case is synchronized or aligned to permit the carriage to travel around the tracks by simultaneous engagement with the rack or traction member 61 (or the friction drive of FIGS. 11 to 13) on each of the track units $T_1$ and $T_2$, FIG. 6. This is another variation which may be used when the nature of the work requires it.

As was mentioned earlier, when the two pipes, $P_1$ and $P_2$, to be joined are brought into end-abutting relationship preparatory to welding, they may be provided with square ends or square ends with a very slight bevel on the outer surface to form a shallow groove which aids in guiding the cutting and welding equipment through means such as the feeler 212 or 207, FIG. 7, or 238, FIG. 1. However, to reduce the amount of metal which must be cut out and hence reduce power requirements or increase cutting speed or both, it is often desirable instead of a truly square butt joint, to provide a bevel on the pipe end which makes a small angle with the perpendicular to the axis of the pipeline. An angle of the order of 8 to 10 degrees of arc on each pipe end, making a V-shaped opening when the pipe joints are brought into abutment of about 16 to 20 degrees, is particularly desirable. In standard pipe it provides a space at the outer surface of approximately the desired dimension of the welding gap width, i.e. on a pipe of 0.280" wall thickness the gap would be about .075 to .090 inch wide at the top. This cuts the energy requirements for cutting the pipe joint approximately in half and serves not only to expedite the operation, but to give firm guidance through feelers such as 208, FIG. 7, to the mechanism which performs the cutting operation. This is a specific improved feature of practical importance. It will be understood that each of the operating units is preferably provided with guiding feelers which drop into the groove or gap, and cause the associated working equipment to follow it accurately. Such feelers may also be used, with suitable electrical connections, to initiate or control various operations. For example, when the feeler 238, on the welder, FIG. 1, falls into the previously cut kerf to a sufficient depth, it may actuate a switch to start the actual welding operation. On reaching the end of the cut the same feeler, or another following behind it, may be used to shut down the welder by cutting off the main welding current and stopping the wire feed.

The above description has been concerned essentially with application to pipelines. It will be understood, however, that by using track members which conform to the surface to be welded, the carriage units may be employed for cutting and welding joints in almost any kind of surface. The traveling carriages 70 and 130 are preferably close-coupled, i.e., the guide wheels, drive mechanism, etc. are compactly arranged so that the degree of curvature of the track does not materially change or affect the travel and accurate guidance of the cutting and welding equipment. Hence, by use of straight tracks, flat plates may be welded and vertical seams on large upright cylindrical tanks may be welded. By other suitable configuration of the guide track structures, horizontal welds around large tanks and one marine vessels and other structures may be performed with only minor changes in the equipment. These are important aspects of the present invention. The use of electromagnetic means to hold, or at least assist in holding, the tracks in place for the cutting and/or welding is also included.

Because of the cutting facilities, and the need for the cutting wheel to project through the entire thickness of the pipe in the preferred method of operation, a backing ordinarily is not employed inside the pipe. However, it is possible to control the depth of penetration of the cutter so that it cuts just barely through the pipe wall, or even slightly less than through, in which case a backing may be employed under the weld where that is deemed desirable. Other modifications and variations will suggest themselves to those skilled in the art, and it is intended to cover the obvious variations and equivalents by the following claims, so far as is consistent with the state of the art.

What is claimed is:

1. An apparatus for forming welds along a predetermined line between two adjoining metal objects which comprises track means for attaching to at least one of said objects parallel to said line, motor driven rotary cutting means adapted to run on said track and adapted to form a gap of uniform width along said line, welding means also adapted to run on said track to form a weld in said gap, said welding means including wire electrode feeding means, means for directing said electrode into said gap, and means for establishing a substantially continuous arc between said electrode and the adjacent walls of said gap thereby to form a substantial weldment between said objects at a single welding pass.

2. Apparatus for joining two lengths of large metal pipe in a welded girth joint, which comprises, in combination, a circular track element mounted around at least one of said lengths of pipe parallel to said joint, means for firmly locking said track element in said parallel position, carriage means adapted to run on said track around and parallel to said joint, motor means for propelling said carriage means around said track element, rotary cutting means carried by said carriage means for forming a gap of uniform width between said lengths of pipe, and welding means carried by said carriage means for welding said gap to form a strong weld around said joint.

3. Apparatus according to claim 2 wherein two track elements are included to facilitate sequential operations without interference with each other.

4. Apparatus according to claim 2 wherein the carriage means is a single carriage.

5. Apparatus according to claim 2 wherein separate carriages are provided for the cutting means and the welding means.

6. A detachable split-ring track apparatus for supporting a carriage for orbital operation about a cylindrical surface which comprises a substantially circular band of metal larger than said cylindrical surface, means for spacing said band at a substantially uniform distance from the periphery of said surface, and tension means distendable under fluid pressure for firmly locking said band against displacement or misalignment.

7. Apparatus according to claim 6 wherein the locking means comprises rotatable cam elements attached at intervals to the circular metal band.

8. In combination, an open ended orbital track adapted to be fitted around a substantially circular body, pneumatic means for spacing the track from said body and applying tension to said track ends to secure the track firmly in place around said body, a plurality of opposed and accurately formed surfaces on said track, and traction means on said track to provide a tractive surface for an orbital carriage.

9. A track as in claim 8 wherein an interior guiding surface is provided overhead and a traction means is formed along a cylindrical element of said track.

10. A track as in claim 8 which consists of a flexible band member adapted to conform to the general surface of a large pipe.

11. The method of welding along a predetermined line which comprises setting up a temporary guide track along said line, firmly securing said track in predetermined position along said line, traversing a feeler to guide movement of a welding device along said line and on said guide track, and concurrently feeding a slender welding electrode to said line and forming an electric arc from said electrode to the line to fuse the electrode material, thereby to form an accurately controlled weld.

12. The method of welding along a predetermined line which comprises setting up a temporary guide track along said line, traversing a preparatory device along said track to perform a grooving operation along said line preparatory to welding, and traversing a feeler ahead of a welding device to guide said welding device and concurrently feeding wire electrode material along said line to complete an accurately controlled weld.

13. Method according to claim 12 wherein the welding step is started before the grooving operation is completed.

14. Method according to claim 12 wherein the welding step is started before cutting is completed and a second cutting step is started before welding is completed.

15. A system for forming girth welds in large pipe lines which comprises detachable open encircling means for guiding operating devices accurately around a pipe, means for mounting said guiding means on a pipe adjacent to a predetermined weld line, welding means including electrode feeding elements adapted to be propelled along said guiding means, groove forming means and groove following feeler means on said welding means for insuring that the welding means accurately follow said predetermined weld line regardless of slight mispositioning of said detachable guiding means.

16. A system according to claim 15 wherein the welding means is mounted in a carriage means which travels along said guiding means, said mounting being such as to permit limited movement of the welding means with respect to the carriage means.

17. In combination, a demountable substantially circular track having guiding surfaces thereon, means for firmly attaching said track to a pipeline adjacent to a line where a girth weld is to be formed, carriage means adapted to be detachably mounted on said track and having cooperating elements for said guiding surfaces, mutually cooperating traction elements on said carriage means and said track, means for driving the traction means on said carriage means to cause the carriage means to move relatively to said track and relatively around said pipeline, preparatory operating means carried by said carriage means along said line to perform an operation preparatory to welding, welding means carried by said carriage means also along said line, and control means along the path of said carriage means for initiating and stopping sequential operations of the preparatory means and the welding means.

References Cited in the file of this patent

UNITED STATES PATENTS

| | | |
|---|---|---|
| 1,531,824 | Smith | Mar. 31, 1925 |
| 2,013,630 | Goldsborough | Sept. 3, 1935 |
| 2,068,166 | Dodge | Jan. 19, 1937 |
| 2,914,653 | Ernst | Nov. 24, 1959 |
| 2,956,147 | Baker | Oct. 11, 1960 |
| 2,960,597 | Bruno et al. | Nov. 15, 1960 |